Figure 1:
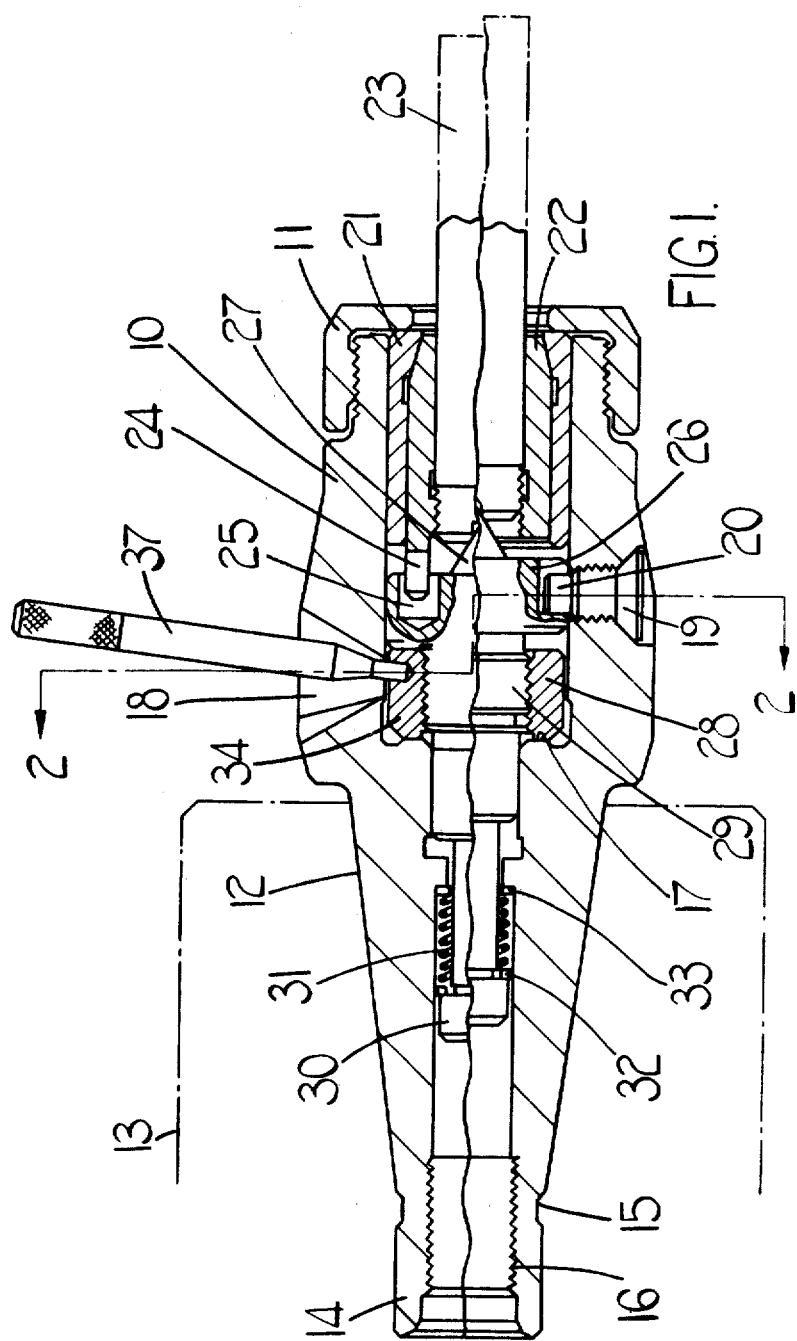

United States Patent
Clarkson

[15] 3,677,560
[45] July 18, 1972

[54] CHUCK HAVING MEANS TO AXIALLY POSITION TOOL

[72] Inventor: Frank Henry Clarkson, Nuneaton, Warwickshire, Guernsey (Channel Island)

[73] Assignee: Clarkson International Tools Limited, Nunecton, Warwickshire, England

[22] Filed: Nov. 2, 1970

[21] Appl. No.: 85,873

[52] U.S. Cl..............................279/47, 279/15, 408/186, 90/11 A
[51] Int. Cl..........................................B23b 31/04
[58] Field of Search...................90/11 A; 408/146, 198, 186; 279/41, 42, 54, 48, 47, 49, 9 A, 15, 50

[56] References Cited

UNITED STATES PATENTS

| | | |
|---|---|---|
| 3,444,781 | 5/1969 | Sunderman et al.....................90/11 A |
| 3,598,500 | 8/1971 | Oxford, Jr..............................408/186 |
| 3,347,115 | 10/1967 | Koch......................................408/146 |

*Primary Examiner*—Gil Weidenfeld
*Attorney*—Holman & Stern

[57] ABSTRACT

A chuck comprising a body, tool gripping means in the body, a tool locating part slidably mounted in the body to control the axial position of the tool whilst maintaining its concentricity, an adjusting ring engaging the tool locating part and being axially located within the body, the body having a lateral opening for access to the adjusting ring, and means on the adjusting ring accessible through the opening whereby it can be rotated by a suitable tool to control axial position of the tool locating part in the body.

3 Claims, 4 Drawing Figures

Patented July 18, 1972

3,677,560

3 Sheets-Sheet 1

INVENTOR
Frank Henry Clarkson
Holman & Stern
ATTORNEYS

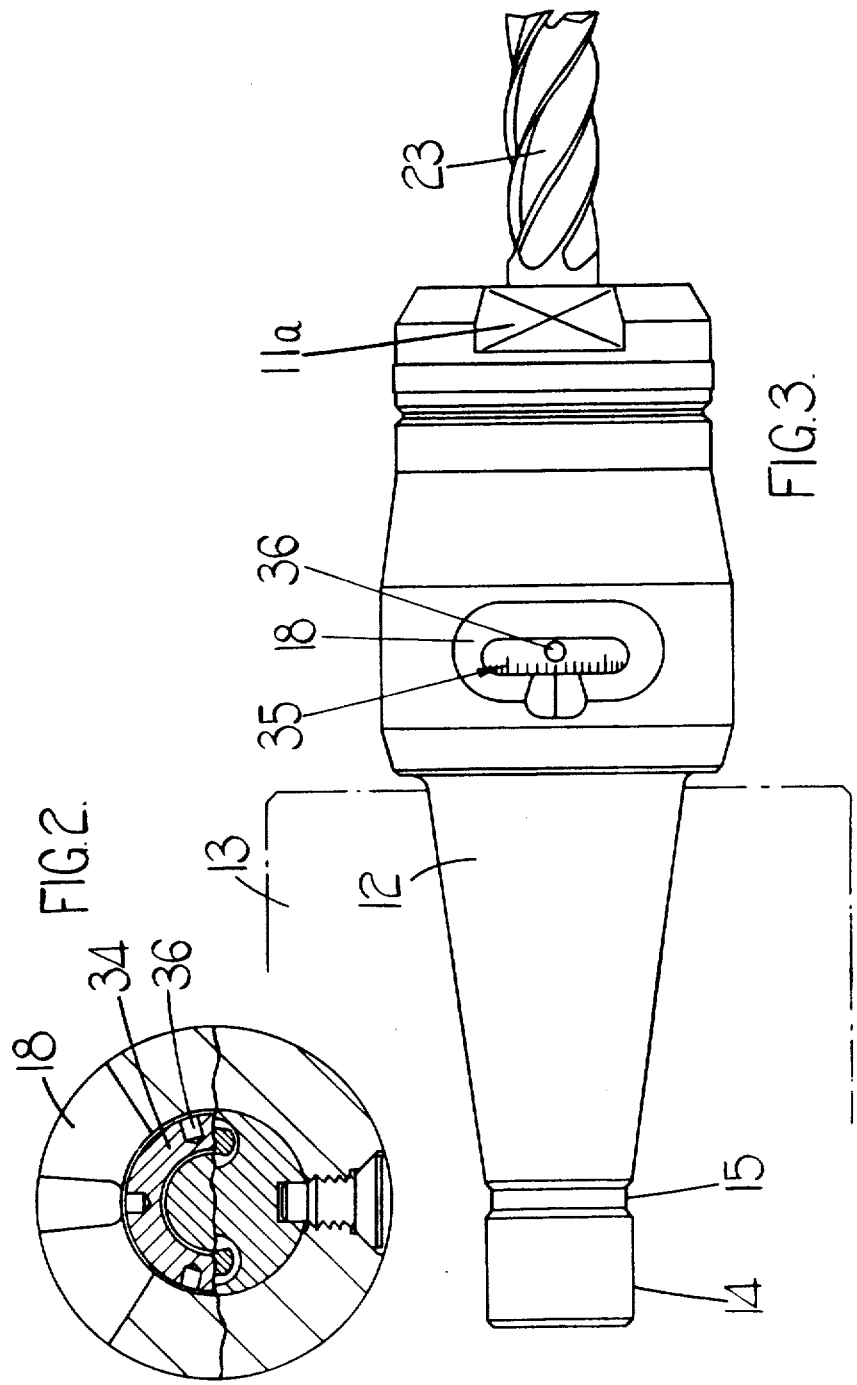

Patented July 18, 1972

3,677,560

3 Sheets-Sheet 3

INVENTOR
Frank Henry Clarkson

ATTORNEYS

CHUCK HAVING MEANS TO AXIALLY POSITION TOOL

This invention relates to chucks for holding tools for use in milling, grinding, drilling or other similar machining operations.

It is necessary, of course, that the tool shall be precisely positioned in the machine and that adjustment of its position can be performed. This adjustment can be carried out through a mechanism in the machine which adjusts that part of the machine on which the chuck is supported. This mode of adjustment is, however, inconvenient in, for example, numerically controlled automatic machines, since a predetermined setting of the machine will be altered thereby.

Accordingly, provision for adjustment within the chuck itself is made in chucks of the kind with which this invention is concerned.

The object of this invention is to provide a chuck in which adjustment of the tool can be performed in a particularly convenient manner.

In accordance with the present invention a chuck comprises a body, a tool gripping means mounted in the body, a tool locating part slidably mounted within the body to control the axial position of a tool in the body whilst maintaining its concentricity therein, an adjusting ring mounted co-axially with, and having screw-threaded engagement with the tool locating part, an end face of the adjusting ring engaging an internal axially presented face in the body, and the body having a lateral opening for permitting access to the adjusting ring, and means on the adjusting ring accessible through said opening whereby it can be rotated by a suitable tool to control the axial position of the tool locating part in the body.

Figure 4:
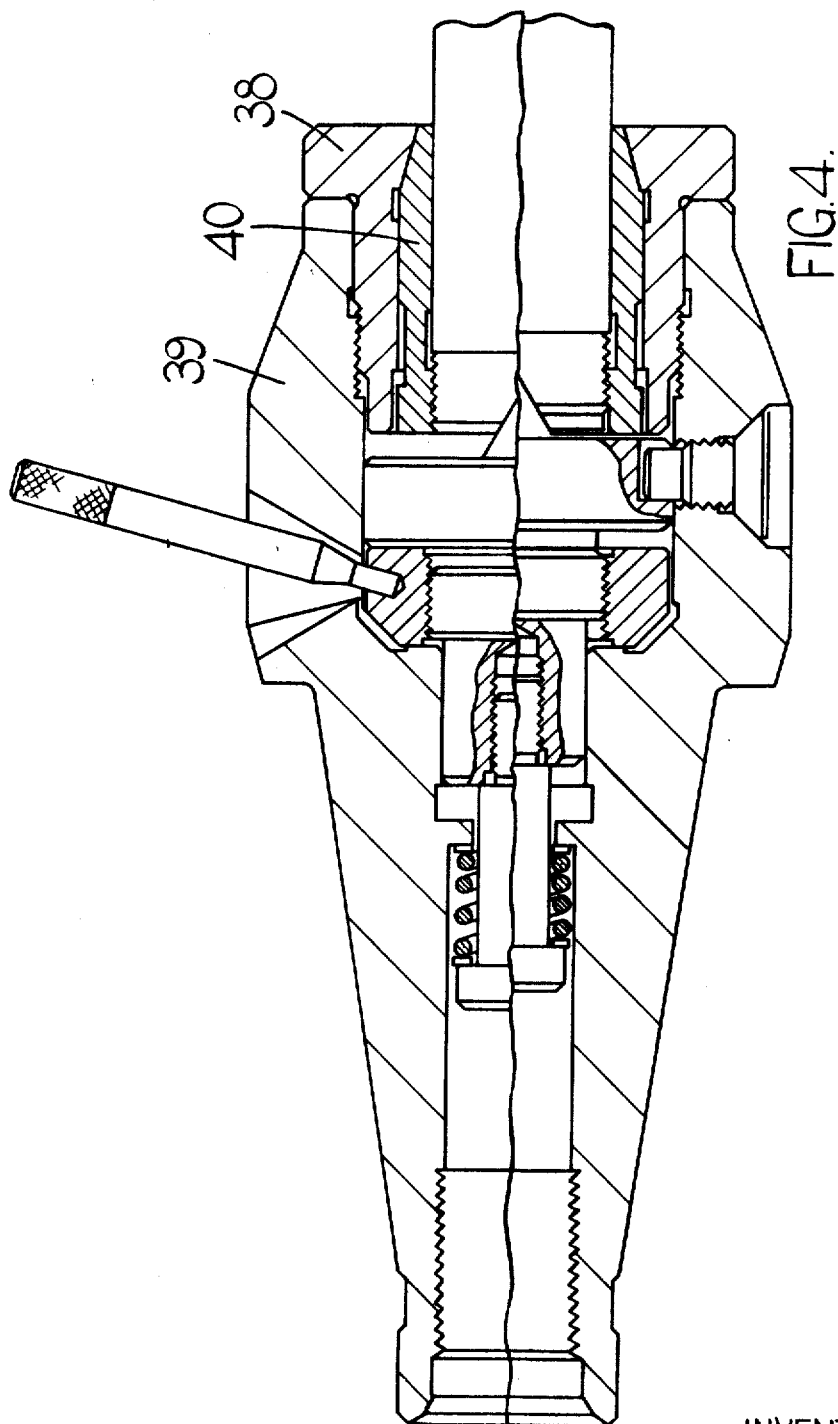

The invention will now be described by way of example with reference to the accompanying drawings in which:

FIG. 1 is a cross-sectional side elevation view of a chuck constructed in accordance with the invention, the parts being shown in two alternative adjusted positions, FIG. 2 is a cross-sectional view on the line 2—2 in FIG. 1, FIG. 3 is a side elevation view, and FIG. 4 is a cross-sectional view of an alternative form of chuck.

With reference to the construction illustrated in FIGS. 1, 2 and 3, the chuck comprises a body 10, one end of which is externally screw-threaded to engage with a screwed collar 11. The other end of the body 10 is externally tapered at 12 to engage in a complimentary tapered opening in a driving head of an associated machine indicated in outline at 13. The extremity of the tapered end of the body is provided with an externally cylindrical portion 14 separated from the smaller end of the tapered portion 12 by an annular groove 15. The features of this end of the body are dictated by the form of the driving head 13 which is substantially standard on such machines.

A co-axial stepped bore extends through the body and at the end which engages in the driving head 13, the bore is screw-threaded at 16 for engagement by a bolt whereby the chuck is secured in the driving head 13.

The bore in the body 10 is wider at its end remote from the screw-thread 16 and in this region is cylindrical. A shoulder 17 is defined at the end of this cylindrical portion of the bore, the shoulder 17 providing an axially presented annular face.

A shaped opening 18 is provided in the wall of the body, intermediate its ends; the purpose of this opening is referred to later. The side walls of the opening incline towards the outside of the body as shown in the drawings.

At the opposite side of the body, in its mid-region, there is a transverse countersunk drilling for reception of a countersink head screw 19 having a short cylindrical extension 20, which protrudes into the bore of the body.

Slidably mounted within the cylindrical bore is a sleeve 21 which is cylindrical on its external surface, and inside is cylindrical over approximately three-quarters of its length. The remaining portion of the internal surface of the sleeve 21 is tapered with the narrower end terminating at the end of the sleeve. The tapered portion engages a complimentarily tapered split collet 22 which is arranged to grip the cylindrical shank of a tool indicated at 23. Tightening of the collar 11 by means of a spanner engaged with flats 11a causes the tapered surfaces on the sleeve 21 and the split collet 22 to engage in such manner that the split collet in turn grips the tool 23. These parts form the element of a tool gripping means of known kind.

The split collet 22 has integral extensions 24 which engage in respective closed ended drillings 25 in a tool locating part 26. The tool locating part has a cylindrical head slidably engaged in the bore in, the body 10 and a central conical formation 27 which engages in a depression in the end of the tool shank.

The drillings 25 are formed in the head and there is also a recess 28 in the periphery of the head in which the extension 20 of the screw 19 engages to prevent rotation of the tool locating part 26 in the bore.

The tool locating part also has a shank slidably engaged in a smaller portion of the bore in the body 10, the shank, adjacent to the head, being externally screw-threaded at 29. The end of the shank, remote from the head, is internally screw-threaded to engage a bolt 30. Surrounding the bolt 30 is a compression spring 31 which acts against washers 32 and 33, one of which is under the head of the screw 30, and the other of which engages a shoulder in the bore in the body 10. The spring 31 urges the tool locating part in a direction towards the tapered end of the body 10.

Engaging the screw-threads 29 on the shank of the tool locating part 26, is an adjusting ring 34. One end of the adjusting ring 34 engages the shoulder 17 in the bore of the body 10.

The external cylindrical surface of the adjusting ring 34 has graduation marks 35 and a number of spaced generally radial drillings 36 which can be engaged by a suitable tool 37 through the opening 18 in the wall of the body 10. FIG. 1 shows such a tool 37 engaged in one of the drillings 36, and by means of this the adjusting ring 34 can be rotated to adjust the axial position of the tool locating part 26 inside the body 10. In turn, this adjusts the position of the tool 23 with respect to the chuck.

The total permissible adjustment is in the order of one-eighth of an inch in this example. In order to carry out adjustment, the collar 11 is slackened and appropriate adjustment is made to the adjusting ring 34 until the tool reaches the required position. The collar 11 is now locked and the axial adjustment will be maintained without the necessity for further locking the adjusting ring 34 on the tool locating part 26. Concentricity of the tool locating part 26 and of the tool 23 with respect to the body is maintained in all positions of axial adjustment.

The tool illustrated in FIG. 3 is an end mill, but the invention can also be applied to grinding, drilling, or other similar machining operations. Whilst a tapered mounting portion of the body, for engagement in the machine, has been shown, other mounting arrangements may be used.

The example illustrated in FIG. 4 differs from the construction shown in FIGS. 1, 2 and 3 only in the form of the chuck which includes a sleeve 38 which is engaged on internal screw-threads in the bore of the body 39. Within this is engaged a split collet 40. Complimentarily tapered surfaces are formed on the inside of the sleeve 38 and on the outside of the split collet 40; the other parts of the chuck are similar to those in the construction shown in FIGS. 1, 2 and 3.

Since the opening 18 is accessible when the chuck is installed on a machine, adjustment can take place without necessitating removal of the chuck from the machine. Furthermore the chuck is so constructed that adjustment can be performed without dismantling of the chuck itself.

Having thus described my invention what I claim as new and desire to secure by Letters Patent is:

1. A chuck comprising a body, tool gripping means carried in the body, a tool locating part slidably mounted within the body, said tool locating part having means to abut one end of a tool to control the axial position of said tool in the body whilst maintaining its concentricity therein, an adjusting ring mounted co-axially with, and having screw-threaded engagement with the tool locating part, an end face of the adjusting ring biased against an internal axially presented face in the body, and the body having a lateral opening for permitting access to the adjusting ring, and means on the adjusting ring accessible through said opening whereby it can be rotated by a suitable tool to control the axial position of the tool locating part in the body.

2. A chuck as claimed in claim 1 in which the lateral opening in the body for access to the adjusting ring is positioned in a position which is accessible when the chuck is fitted into a machine.

3. A chuck as claimed in claim 1 in which the means on the adjusting ring for co-operation with a suitable tool comprises a number of spaced generally radial holes therein which can accept the end of a tool which can be moved within the confines of the body opening.

* * * * *